Nov. 3, 1942.  G. E. M. PERROUX  2,300,593
RADIO GUIDING SYSTEM
Filed Dec. 9, 1937

INVENTOR:-
G.E.M. PERROUX.
BY ED Phinney
ATTORNEY

Patented Nov. 3, 1942

2,300,593

UNITED STATES PATENT OFFICE 2,300,593

RADIO GUIDING SYSTEM

Georges Edme Marcel Perroux, Paris, France, assignor to International Standard Electric Corporation, New York, N. Y.

Application December 9, 1937, Serial No. 178,901
In France December 17, 1936

1 Claim. (Cl. 177—352)

The present invention relates to devices for responding to electric signals constituted by variations above or below a mean current or potential level and more particularly to devices of this kind employed in blind landing systems for aeroplanes or other systems for guiding vehicles by radio-electric waves.

One of the objects of the invention consists in the provision of efficient visual indicating devices in systems for the radio guiding of vehicles in which different signals are received on the vehicle when it deviates to the right or left of the course to be followed, these signals providing a continuous dash signal when the direction of the vehicle coincides with the course to be followed. Such indicator devices are adapted to be opererated by the output current of a radio receiver, for example, by the potential difference across a resistance in the output circuit of the receiver.

According to the invention in apparatus for responding to electric signals constituted by variations above or below a mean current or potential level, means is provided for suppressing the mean steady current or voltage component from the signals whereby the signal responsive means responds only to the signal variations above such mean level. Devices for suppressing the steady current or voltage component may comprise balanced bridge arrangements employing one or more resistances which vary in accordance with the applied current or potential or such devices may comprise cascade or push-pull arrangements of thermionic valves.

The invention will be explained in more detail in the following description based on the attached drawing, in which.

Figure 1:
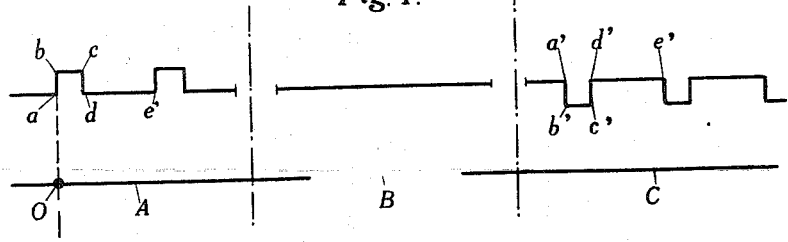
Fig. 1 shows diagrams of the potential appearing at the ends of a resistance in the output circuit of the signal receiver on a vehicle according to the position of the vehicle with respect to the path to be followed.

In systems for guiding vehicles employing radio signals, for example, dots and dashes, the indications received by the vehicle are as shown in Fig. 1; in the portion A of this figure, are shown the forms abcd of signals for one position, on the left for example, of the vehicle with respect to the desired course; in the portion B the vehicle is on this course and in the portion C it is to the right of the course. The teeth forming the signals shown on the portions A and C are on either side of a mean value (represented by the line on the portion B) of the rectified output current of the receiver or of a difference of potential taken across the terminals of a resistance in the output circuit of the receiver.

A visual indicator, such as is provided by the present invention, mainly has the object of showing, in magnitude and sign, the teeth abcd and a'b'c'd' of the portions A and C respectively in Fig. 1 the direction of which with respect to the mean ordinate Oa indicates the direction of the deviation of the vehicle with respect to the desired course. This indicator may obviously consist of a simple measuring apparatus such as a voltmeter, the needle of which reproduces by means of deflections on either side of its mean position the teeth represented in Fig. 1. However, such an indicator directly placed in the output circuit of the receiver will not be very sensitive, on account of the weakness of the variations ab and a'b' with respect to the mean ordinate Oa.

Figure 2:
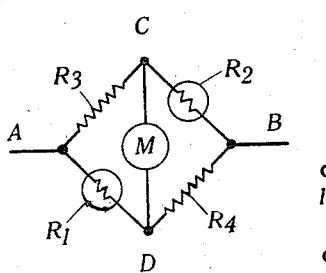
Fig. 2 represents a Wheatstone bridge arrangement of a visual indicator employing features of the invention.

Referring to Fig. 2, the indicator M which may comprise a voltmeter is arranged in the diagonal of a Wheatstone bridge comprising two fixed resistances R3 and R4 and two resistances R1, R2 which vary according to the applied potential or current. The bridge is balanced for a predetermined difference of potential between its terminals A and B. The balance of the bridge is upset for any value of the potential applied to the terminals other than the potential for which it is balanced, by reason of the variation of the values of the resistances R1 and R2 according to the applied potential. These resistances R1 and R2 may consist, for example, of filaments of incandescent lamps, but may also be constituted by internal resistances of ferro-hydrogen valves or by any other suitable elements. In this manner, the direction of the current in the diagonal CD including the indicating device M depends on the difference between the potential applied at the terminals A and B and the potential at which the bridge is balanced.

If the output current, rectified if necessary, of a radio receiver of the type normally employed in radio guiding systems is applied to terminals A, B, the indicator M will indicate by deflections to the right or left of its position of rest, the magnitude and direction of the signals such as *abcd* of Fig. 1, thus indicating the deviation of the vehicle with respect to the desired marked course.

If it is not possible or desirable to rectify the signals before applying them to the Wheatstone bridge, a rectifier may be placed in the diagonal of the bridge in which the indicator M is inserted. The deflections of the indicator are in this case always in the same direction and do not indicate on which side of the course or axis the vehicle is situated. It may, however, be desirable in certain circumstances to employ such an arrangement. When the bridge is fed with direct current, a portion of the current may be supplied by a separate source of constant value for example, by a current taken from the terminals of a potentiometer; the receiver then only supplies sufficient current for balancing the bridge. The bridge is adjusted by means of the potentiometer and the current supplied by the receiver gives the desired indications.

Figure 3:
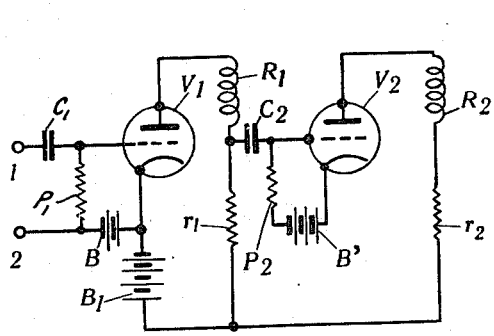
Fig. 3 shows a thermionic amplifier circuit adapted to be used in a visual indicator according to the invention.
Figure 4:
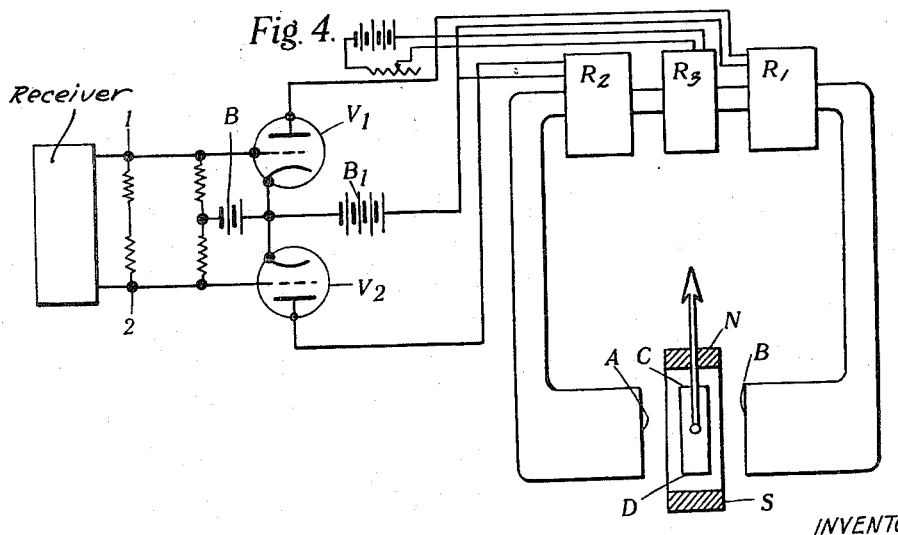
Fig. 4 shows a modification of the arrangement of Fig. 3 provided with a visual indicator in accordance with certain features of the invention.

Figs. 3 and 4 represent examples of indicator devices employing amplifier valves. The arrangement of these figures give similar but even better results than the resistance bridge arrangements of which an example was given in Fig. 2.

Referring to Fig. 3, the valve V1 of linear characteristic operating as very low frequency amplifier, has its grid-cathode circuit connected between two output terminals 1 and 2 of the usual radio receiver of a radio guiding system. The grid-cathode circuit of the valve V1 comprises the battery B, condenser C1 and the resistance P1. The plate voltage is provided by the battery B1 through the ohmic resistance $r_1$ and the inductive resistance R1 in series. The resistance R1 may consist of one winding of the visual indicator employed.

The signal first rectified is applied between the grid and filament of the valve V1 whose plate current then comprises a constant direct component of value $i$ and a pulsatory component which is following the pulsations of the received signal such as *abcd* of Fig. 1. The portion of the indicator, of which one winding R1 is connected in the plate circuit of the valve V1, will then be comparable with that of a simple wattmeter, in which case the useful effect $di$ is liable to be masked by the direct component $i$ of the plate current.

The effect of the steady current $i$ might obviously be cancelled by a potentiometric arrangement on the terminals of the winding R1. It is preferred however, to provide the indicator with a second winding R2 similar to R1 traversed by the plate current of a second valve V2 similar to V1 operating under the same conditions, that is to say, having the same value $i$ of plate current.

Under these conditions, in the absence of a signal or when the signal has a constant amplitude as indicated on the region B of Fig. 1, the windings R1 and R2 of the indicator are traversed by currents the effects of which cancel each other and the armature remains in its zero position. This balancing persists whatever the constant amplitude of the signal applied to the valve V1 inasmuch as this amplitude remains constant. When the amplitude of the signal varies, which is the case with signals such as those employed in blind landing systems, the balance is upset and the indicator indicates the magnitude and direction of the variation of amplitude of the signal.

The valve V2 obviously serves to cancel the effect of the constant current $i$ in the windings of the indicator apparatus. It may, moreover, be employed to increase the sensitivity of the device by a suitable choice of the values of the resistance $r_1$ in series with R1 and of the capacity C2 which couples the two circuits of the valves so as to transmit the very low frequencies employed. The ratio R1 to $r_1$ is preferably chosen such that the amplification between grids of V1 and V2 is equal to unity. The valve V2 operates as phase-changer; the indicator is then subjected to equal impulses, which are, however, of opposite phase, and the effects of which are additive since the windings are in opposition.

It is also possible to insert a volt-meter between the plates of the valves V1 and V2. The resistances R1 and R2 may then be employed as simple adjusting resistances.

Referring to Fig. 4, this arrangement shows the two valves V1 and V2 arranged in push-pull instead of in cascade. The windings R1 and R2 of the indicator are then inserted in series in the plate circuits of the valves. The rectified input signals are applied between the terminals 1 and 2 and the operation of the indicator is similar to that of the arrangement of Fig. 3. As is well known in the operation of tubes in push-pull, when a signal is applied to the input of the tubes, the plate current of one tube increases while the current of the other decreases. Hence, when the input signal has one polarity, one of the inductive resistances $R_1$ or $R_2$ will be passing more current than the others, and the indicator will be moved in one direction. When the signal has the opposite polarity, the indicator will move in the opposite direction. With no signal, however, the currents in $R_1$ and $R_2$ are made equal and the indicator assumes a neutral position. Other arrangements employing amplifying valves may also be employed, such as for example an arrangement comprising a double valve with single cathode in place of the two valves V1 and V2 of Fig. 4.

In practice, it may be that the valves V1 and V2, although of the same type, have slightly different steady plate currents. The indicator then assumes a position of equilibrium which does not exactly coincide with its mean ideal position. This may be corrected in several known ways, for example, by adjustment of the resistances $r_1$ or $r_2$ of Fig. 3, by adjustment of the bias of the grids of the valves, or in any other suitable manner. However, it is preferred to provide the indicator apparatus with a third winding R3, as shown. This auxiliary winding is traversed by a direct current the value and direction of which are adjusted by a potentiometer arrangement. The disturbing effect on the armature of the indicator is thus eliminated by compensation.

The windings R1, R2 and R3 are indicated by blocks on the yoke of the inductor AB. A movable armature CD comprising a soft iron bar is pivoted to rotate between the pole pieces A and B of the inductor. A permanent magnet NS is arranged so as to polarise the armature CD to bring it back after its deflection to its mean position of equilibrium.

It will be clear that the system described above may have applications outside the field of visual indicators for guiding vehicles. The windings R1 and R2, for example, may comprise the windings of a polarised relay adjusted to its neutral position. Intermittent signal indications are then translated into a stable deflection of the armature of the relay as long as the direction of the signal impulse does not change. This modification may be applied particularly to automatic steering systems by means of radio signals, the armature of the relay closing in one position or the other a control circuit for operating the steering apparatus of the vehicle.

The invention is also applicable to apparatus for recording telegraph signals.

What is claimed is:

In a radio guiding apparatus for vehicles, a visual indicator on the vehicle comprising a yoke, a plurality of coils disposed on said yoke and a polarized indicator controlled thereby; a radio receiver, output terminals therefor across which received signals appear as direct current impulses varying above and below a mean level to indicate deviations to the right or left of a desired course, two valves each having a cathode, a grid and an anode with circuits therefor, a circuit connecting a grid of each valve to one of said output terminals, a resistance connecting said grids, a source of grid bias potential connecting the midpoint of said resistance to the cathode of each valve, an inductive resistance comprising one of said coils in the anode circuit of one of said valves for moving said indicator in one direction, an inductive resistance comprising another of said coils in the anode circuit of the other valve for moving the indicator in the opposite direction, and means for controlling the position of said indicator comprising a single coil disposed on said yoke, and adjustable means for controlling the flow of direct current through said coil.

GEORGES EDME MARCEL PERROUX.